Jan. 21, 1941.   M. P. BLOMBERG ET AL   2,229,203
CAR LIGHTING
Original Filed Aug. 17, 1934   4 Sheets-Sheet 1
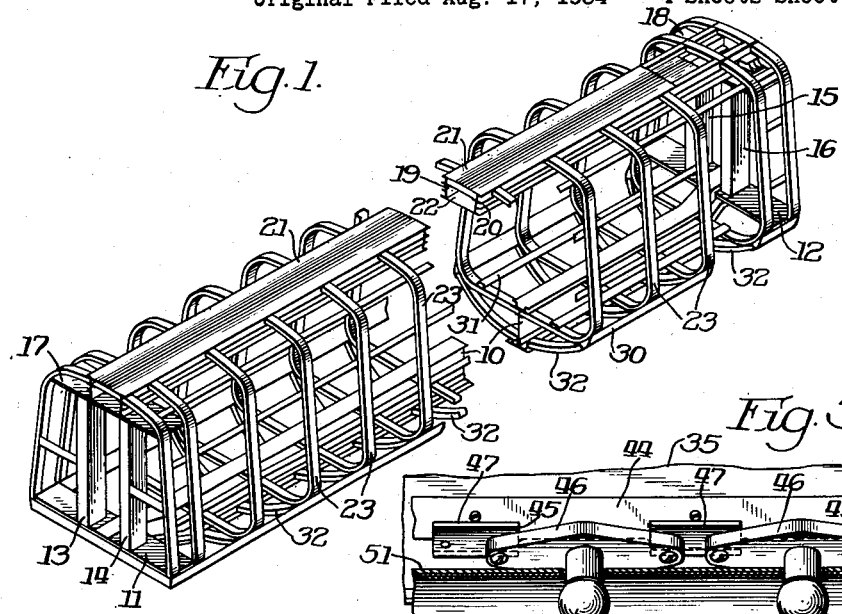
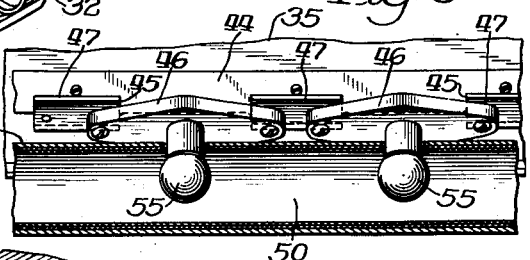
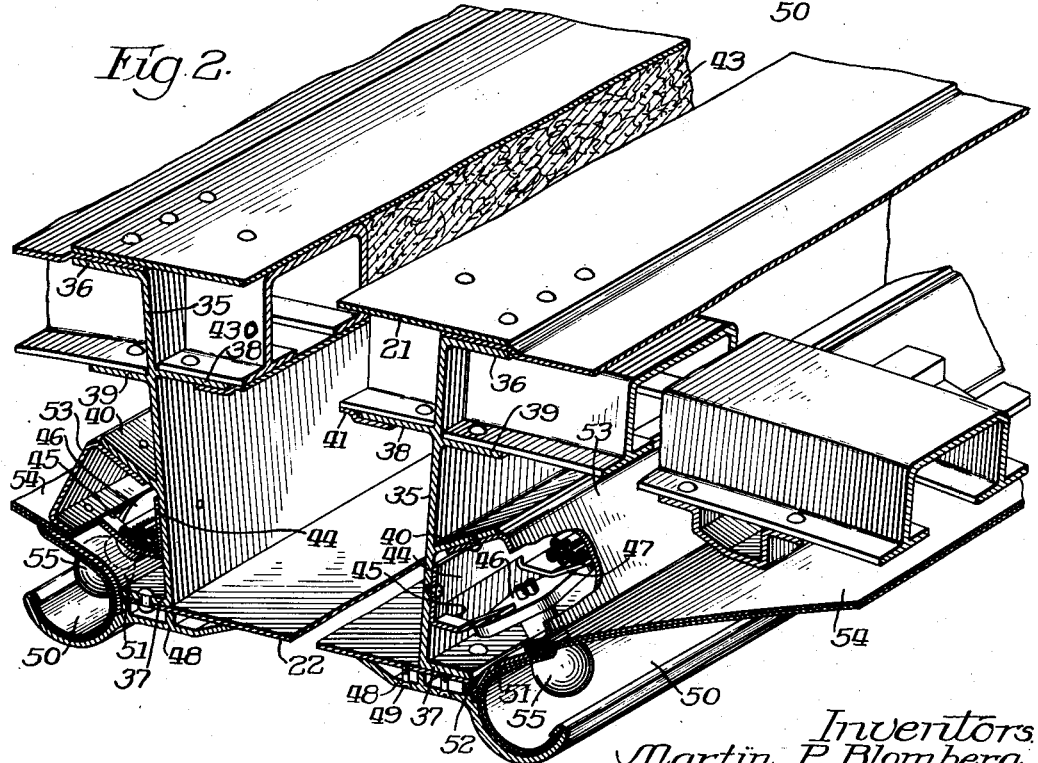
Inventors
Martin P. Blomberg.
William H. Mussey.
By Wilson, Mann & Cox, Attys Inventors
Martin P. Blomberg
William H. Mussey Jan. 21, 1941.  M. P. BLOMBERG ET AL  2,229,203
CAR LIGHTING
Original Filed Aug. 17, 1934   4 Sheets-Sheet 3

Inventors
Martin P. Blomberg
William H. Mussey
By

Jan. 21, 1941.   M. P. BLOMBERG ET AL   2,229,203
CAR LIGHTING
Original Filed Aug. 17, 1934    4 Sheets-Sheet 4

Inventors
Martin P. Blomberg
William H. Mussey
By Gillson, Mann & Cox, Attys.

Patented Jan. 21, 1941

2,229,203

UNITED STATES PATENT OFFICE 2,229,203

CAR LIGHTING

Martin P. Blomberg, Hinsdale, and William H. Mussey, Chicago, Ill., assignors, by mesne assignments, to Adlake Company, Chicago, Ill., a corporation of Illinois Application August 17, 1934, Serial No. 740,336
Renewed August 16, 1937

21 Claims. (Cl. 240—7.35)

The principal object of this invention is to improve the car lighting equipment now found in railway cars and similar passenger carrying vehicles, and more particularly to eliminate glare by using indirect lighting; to combine the lighting fixtures with an overhead air duct running longitudinally of the car body; to provide illumination for the underside of the air duct; and to produce novel and esthetic lighting effects.

Further and other objects and advantages will become apparent as the disclosure proceeds and the description is read in conjunction with the accompanying drawings, in which Fig. 1 is a diagrammatic, perspective view of body framework illustrating an application of this invention;

Fig. 2 is a fragmentary, perspective view of one embodiment of the invention;

Fig. 3 is a fragmentary, sectional view taken on the line 3—3 of Fig. 4;

Figure 4:
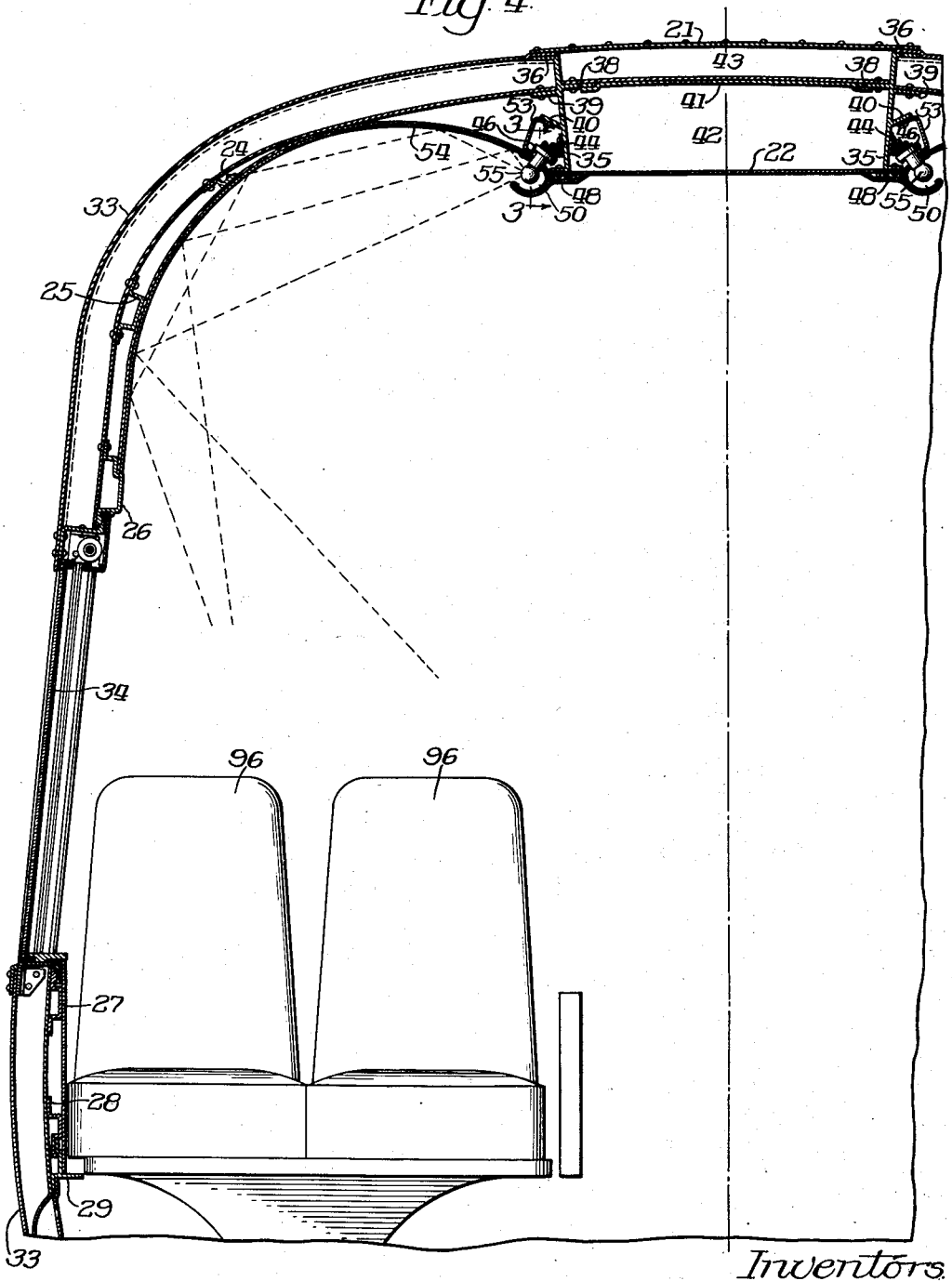
Fig. 4 is a fragmentary, cross sectional view through the car body illustrating the manner in which the ceiling sheets reflect the light waves emanating from the lighting trough.

But these specific illustrations are for the purpose of disclosure and the appended claims should be construed as broadly as the prior art will permit.

The invention may be applied to many types of car bodies, a railway car body being illustrated in Fig. 1 that is particularly suitable for use when streamlining effects are desired. The car body there shown comprises a center sill 10, end sills 11 and 12, secured to opposite ends of the center sill, door end posts 13 and 14, and 15 and 16, rising from the end sills 11 and 12, respectively, top anti-telescoping plates 17 and 18 which rest upon the door end posts, and top sills 19 and 20 supported by the end posts and connected at the top and bottom by plates 21 and 22 which, with the top sills, form a box girder extending from one end of the car to the other. All of these structural members are preferably made of aluminum alloy and together constitute the main framework of the car.

The shell of the car is formed by a plurality of curved ribs 23 which extend from the top sills 19 and 20 to the upper portion of the center sill 10. The ribs lie in vertical planes and are connected together by various longitudinal framing members, such as a roof stringer 24, a deck stringer 25, a window header stringer 26, a belt rail 27, a seat stringer 28, a seat sill 29, a side sill 30, and a plurality of floor stringers, one being indicated at 31.

The belly of the car is formed by arcuate bars 32 which extend from the side sills 30 to the bottom of the center sill 10.

The framework is covered with metal sheathing 33 as shown in Fig. 4, windows being provided at 34.

In the embodiment of the invention shown in Figs. 1–4 inclusive, the top sills 19 and 20 are extruded aluminum members, and each comprises a vertical web 35, top and bottom flanges 36 and 37, respectively, an inwardly extending flange 38 spaced from the top of the sill, and intermediate, outwardly extending flanges 39 and 40, the latter being inclined upwardly, as best shown in Figs. 2 and 4.

A metal plate 41 which is fastened to the inwardly extending flange 38 divides the space enclosed by the box girder into an air duct space 42 and an insulation space 43. The ribs 23 frame into the channel formed by the flanges 36 and 39 of the top sill, and spacers 430 of cross section corresponding to the ribs rest upon the inwardly extending flanges 38 of the top sills and give additional strength to the box girder construction.

A cable shelf 44 is secured to the vertical web 35 of each top sill just below the upwardly inclined flange 40, and notches 45 are cut out at intervals corresponding to the placement of light sockets 46 which are secured to an inclined flange 47 of the cable shelf.

On opposite sides of the air duct are longitudinally extending lighting troughs 48 which are fastened to the bottom plate 22 of the box girder by screws 49 and are lined with reflectors 50, as best shown in Fig. 2. The top portion of the reflector is backed by a curved plate 51 which is screwed to the lighting trough as indicated at 52.

A cover plate 53 is secured to the upwardly inclined flange 40 of the top sill and to the back plate 51, the fastening means constituting the latter attachment also serving to clamp the inner margins of finish or ceiling sheets 54 to the top sill assembly. The ceiling sheets are preferably painted with some material that will diffuse the light which falls upon the surface of the sheets in order that a more even distribution of light throughout the car is obtained. Aluminum paint has been found satisfactory for this purpose.

Light bulbs 55 project through the plates 51 and into the lighting troughs and cast their light generally outwardly and upwardly assisted by the reflectors 50, the ceiling sheets then diffusing the light evenly throughout the car. The occupants of the car are unable to see the light bulbs due to their position within the lighting troughs.

Figure 5:
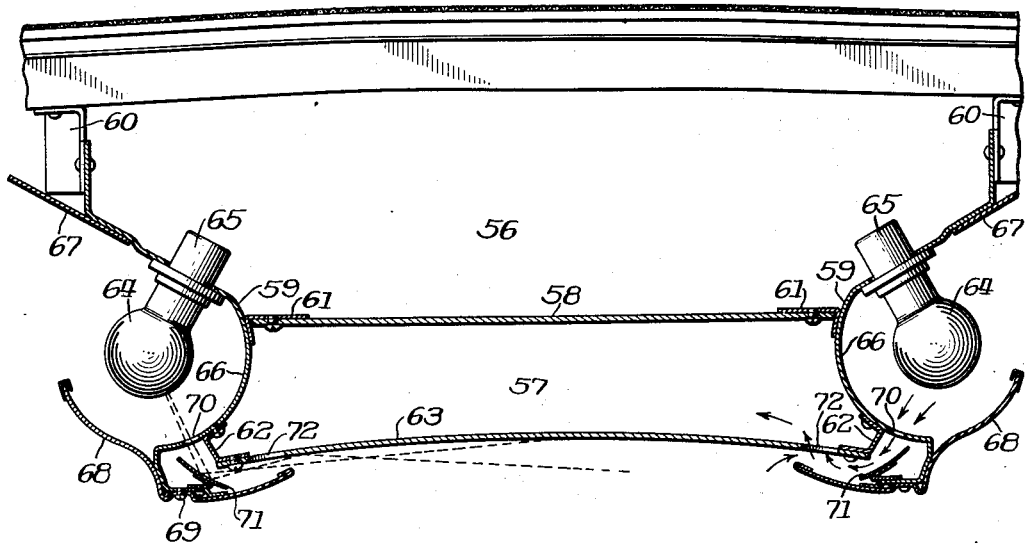
Fig. 5 is a cross sectional view showing a modified form of the invention.
Figure 6:
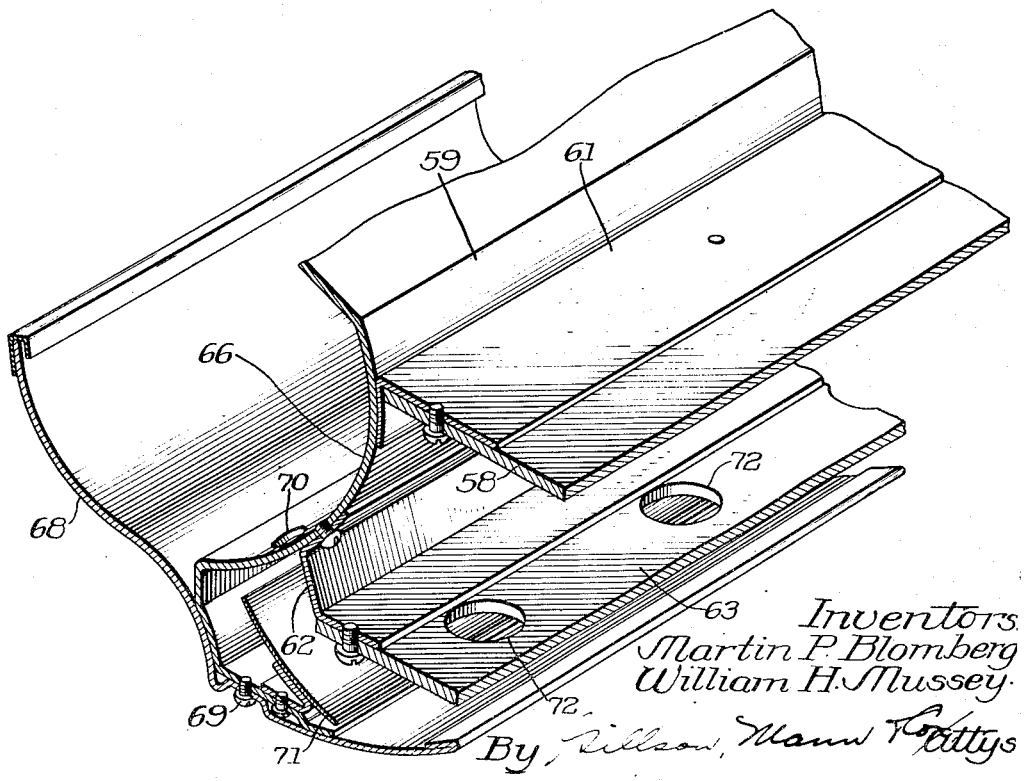
Fig. 6 is a fragmentary, perspective view showing details of the form of invention shown in Fig. 5.

In Fig. 5, the lighting troughs flank a fresh air duct 56 and a vitiated air duct 57, the two ducts being separated by a partition 58. Provision is made in this embodiment of the invention for illuminating the underside of the box girder.

The sides of the duct comprise pressed steel plates 59, the top flanges of which are anchored to brackets 60. Angles 61 provide a fastening surface for the partition 58, and channels 62 provide a means for supporting the bottom closure plate 63 of the vitiated air duct 57. The partition 58 and the closure plate 63 are preferably of light sheet metal, or plywood.

As before, light bulbs 64 are spaced at intervals in the lighting troughs and are supported in sockets 65 carried by the side plates 59. They cast their light generally outwardly and upwardly assisted by the reflecting surface 66 of the lighting trough, and ceiling sheets generally indicated at 67, reflect the light downwardly and diffuse it throughout the car. A blind 68 secured by screws 69 to the bottom flange of the side plates 59 completes the lighting trough and hides the light source from the view of the car occupants.

In order that the underside of the bottom closure plate 63 of the air duct 57 may be illuminated, openings 70 are provided at intervals corresponding to the light bulbs so that a certain amount of light may fall upon a reflector plate 71 and be reflected on the underside of the closure plate. The closure plate is preferably curved slightly upwardly in order to facilitate its illumination.

The heat created by the light sources in the troughs is conveniently drawn away by providing openings 72 in the vitiated air duct, the warm air being drawn into the ducts as indicated by the arrows in Fig. 5. The same openings are used for withdrawing vitiated air from the car interior.

Figure 7:
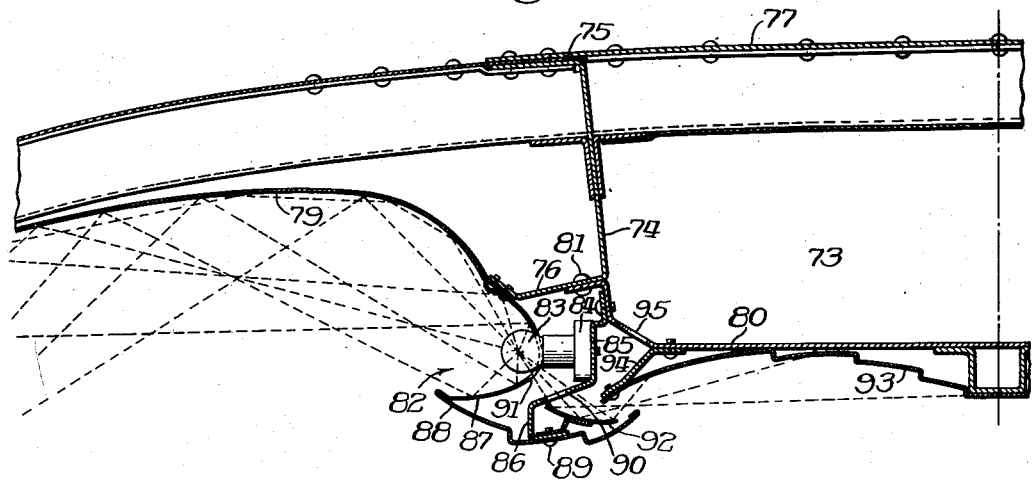
Fig. 7 illustrates a third embodiment of the invention.
Figure 8:
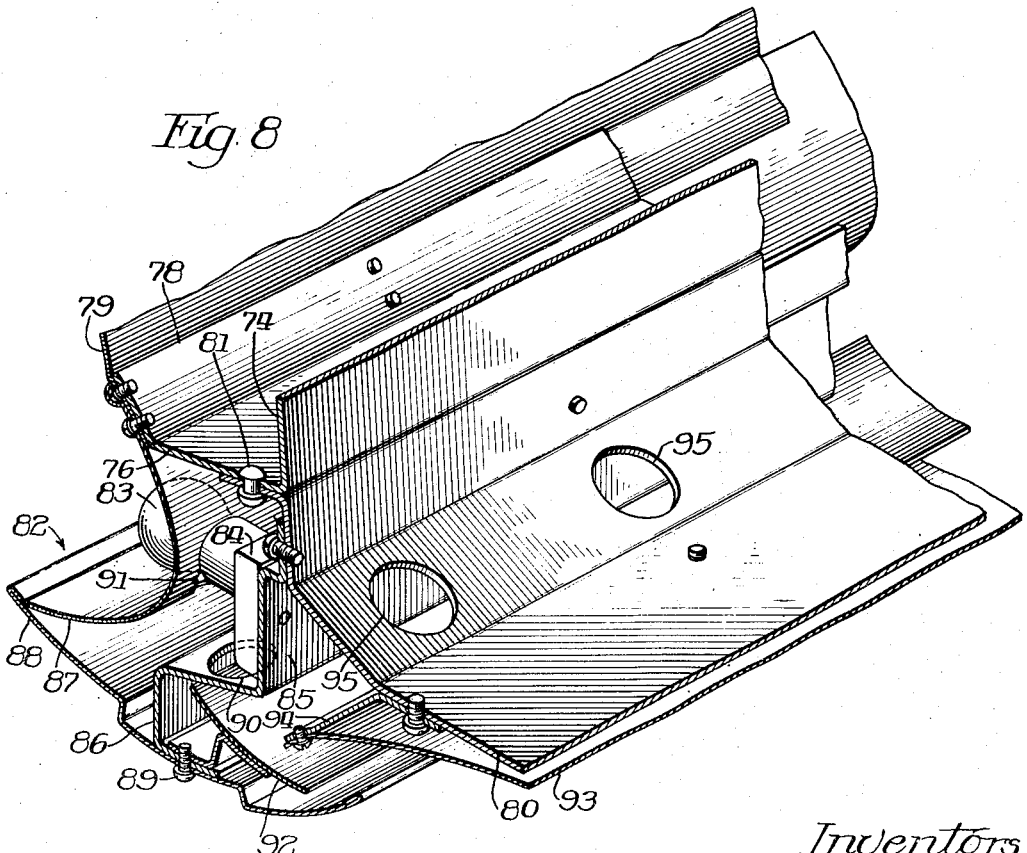
Fig. 8 is a fragmentary, perspective view amplifying the showing of Fig. 7.

In the embodiment of the invention shown in Figs. 7 and 8, the duct space 73 is for vitiated air, or air to be recirculated, and the fresh air is delivered to the car interior through floor ducts (not shown.) The sides 74 of the duct comprise pressed steel plates having top and bottom flanges 75 and 76, respectively, the former providing a surface to which the top stress plate 77 may be riveted, and the latter having an upwardly inclined marginal flange 78 to which the ceiling sheet 79 is fastened. The bottom stress plate 80 of the box girder is riveted to the bottom flange of the duct sides, as indicated at 81.

In this embodiment of the invention, the light bulbs 83 project horizontally into the lighting trough, generally designated 82, the lamp sockets 84 being secured to a vertical web 85 of a support plate 86, the top flange of which is secured to the bottom plate 80 of the duct 73. A reflector 87 having a polished face is secured at the top to the upwardly inclined flange 78 of the duct side 74, and rests on a finish plate 88 which is secured at 89 to the support plate 86.

The support plate 86 has a plurality of openings 90 which are alined with similar openings 91 in the reflector 87 so that light rays may fall upon a slightly concave reflector 92 and be directed on the underside of the duct finish plate 93, the latter being stepped for ornamental purposes. The outer edge of the finish plate 93 is supported by an obtuse angle 94.

The embodiment of the invention shown in Figs. 7 and 8 has the advantage that more of the light emitted by the source 83 is directed against the ceiling sheets 79 and consequently better illumination is provided. Furthermore, the arrangement provides better illumination of the underside of the overhead duct.

The heat created by the light source is dissipated as before by locating the openings 95 in the return air duct 73 in proximity to the lighting troughs.

No attempt has been made to illustrate in the drawings the ventilating or air conditioning systems of which the air ducts are a part, for this forms no part of the present invention.

It will be understood that it is not essential in all cases for the space between the lighting troughs to be used as an air duct, although it is convenient for it to be so used. Furthermore, the mounting of the lighting troughs on opposite sides of the box girder enable relatively deep top sills to be used, and yet have the light source properly located for indirect lighting.

The lighting effect produced by the arrangement of this invention may be widely varied to suit individual taste. For example, the bottom plate of the box girder may be shaped so that there are alternate light and dark zones, and the skillful use of paints can enhance this effect.

It will be observed by referring to Fig. 4 that persons sitting in the car seats, indicated at 96, have good reading light and no glare due to the arrangement of the light source within the troughs and the reflection by the ceiling sheets.

While in the summertime it is desirable to dissipate the heat created by the lights, in the wintertime when car heating is necessary, the heat from the lights may be used to advantage by recirculating the air drawn from the car interior through the air duct after adding whatever additional heat is necessary to secure proper car temperature.

It will be noticed that the ceiling sheet 79 in Fig. 7 has a relatively small radius adjacent to the lighting trough, and also, that light rays directed upon this portion of the sheet are carried along the sheet for some distance before being reflected downwardly on the car seats. By this arrangement, the ceiling sheet is substantially uniformly illuminated, and glare adjacent to the lighting trough is avoided.

The system of indirect lighting herein disclosed is highly efficient because the light rays are dispersed throughout the car while travelling a minimum distance. This is particularly important since the illumination of any surface is inversely proportional to the square of its distance from the source of light.

I claim:

1. In combination with a railway car or similar vehicle, a pair of laterally spaced overhead lighting troughs extending longitudinally of the vehicle on opposite sides of the car center line, a horizontal plate connecting the two troughs, sources of light within the troughs, curved ceiling sheets adapted to reflect the light emanating from the troughs and distribute it throughout the car without glare, said source of light being hidden by said troughs from the direct view of the vehicle occupants, and means for illuminating the underside of said connecting plate by said source.

2. In combination with a railway car, or similar vehicle, a pair of laterally spaced overhead lighting troughs extending longitudinally of the vehicle on opposite sides of the car center line, a horizontal plate connecting the two troughs, a source of light within the troughs, curved ceiling sheets adapted to reflect the light emanating from the troughs and distribute it through the car without glare, said source of light being hidden by said troughs from the direct view of the vehicle occupants, and means for illuminating the underside of said connecting plate by said source, said means including a reflecting surface supported beneath one of the troughs.

3. In combination with a railway car, or similar vehicle, a pair of laterally spaced overhead lighting troughs extending longitudinally of the vehicle on opposite sides of the car center line, a horizontal plate connecting the two troughs, a source of light within the troughs, curved ceiling sheets adapted to reflect the light emanating from the troughs and distribute it throughout the car without glare, said source of light being hidden by said troughs from the direct view of the vehicle occupants, and means for illuminating the underside of said connecting plate by said means, said means including a plurality of openings in one of the troughs and a reflecting surface beneath the openings for directing the light on the car connecting plate.

4. In combination with an overhead air duct in a railway car, or similar vehicle, lighting troughs running longitudinally along opposite sides of the duct, lighting means within the troughs, curved interior finish sheets adapted to reflect the light emanating from the troughs and distribute it throughout the car without glare, said lighting means being hidden by said troughs from the direct view of the vehicle occupants, and means for withdrawing warm air from around the lighting means through said air duct.

5. In a car body having a member extending longitudinally of the roof of said car body, said member having flanges extending laterally therefrom, lighting troughs and cable shelves secured to said flanges, light members supported by said shelves and extending into said troughs, ceiling plates for reflecting rays of light from said members into the lower portion of said car, said troughs concealing said members from the occupants of said car body.

6. In combination with a railway car or similar vehicle, a comparatively narrow overhead lighting structure extending longitudinally of the vehicle substantially from one end portion of the car to the other and being symmetrical with the car center line and having an undersurface to be illuminated, a source of light within the structure directing light outwardly on opposite sides of the structure, said lighting structure comprising reflecting surfaces beneath said source of light extending continuously throughout the length of said structure, curved ceiling sheets adapted to reflect the light emanating from the source and distribute it throughout the car without glare, said source of light being hidden by the structure from the direct view of the vehicle occupants, and means below and adjacent to said undersurface for reflecting light from said source onto the said undersurface of the structure.

7. In combination with a railway car or similar vehicle, a combination overhead lighting structure and air duct extending longitudinally of the vehicle and having an undersurface to be illuminated, sources of light within the structure, elongated light reflecting members beneath the sources of light and extending longitudinally of said vehicle, curved ceiling sheets adapted to reflect the light emanating from the source and reflected by said reflecting members and distribute it throughout the car without glare, said source of light being hidden by said reflecting members from the direct view of the vehicle occupant, and means for reflecting light from said sources to illuminate said undersurface of the structure.

8. In combination with a railway car or similar vehicle, an overhead lighting structure extending longitudinally of the vehicle symmetrical with the car center line and having an undersurface to be illuminated, sources of light within the structure, elongated reflecting means extending longitudinally of the vehicle beneath said sources of light, curved ceiling sheets adapted to reflect the light emanating from the source and distribute it throughout the car without glare, said source of light being hidden by the structure from the direct view of the vehicle occupant, and means for illuminating said undersurface of the structure, said means including a reflecting surface at least a portion of which extends beneath said undersurface.

9. In combination with a railway car or similar vehicle having a passenger compartment, a lighting structure extending longitudinally along the central portion of the car above said compartment, said structure comprising a lighting trough, sources of light distributed along said trough and within the same, said trough comprising elongated reflector means beneath said sources of light for reflecting the light from said sources upwardly and laterally for illuminating the interior of said car without glare, and means below and adjacent to said trough for directing light from said sources onto the under side of said lighting structure for illuminating the same.

10. In combination with a railway car or similar vehicle having a ceiling adapted to reflect and diffuse light, an elongated overhead lighting structure including a trough, a source of light in the trough, a reflecting surface associated with the trough for directing light from said source against the ceiling whereby the light is distributed throughout the car without glare, and a reflector plate in a horizontal plane below the horizontal plane of said source of light for directing a portion of light from said source on the under side of the structure to illuminate said under side.

11. In combination with a railway car having windows and having a curved ceiling adapted to reflect and diffuse light, an overhead air duct and lighting structure extending substantially the length of a car, a source of light in the structure, a reflecting surface associated with the structure for directing light from said source against the ceiling and intercepting all direct rays from said source that are directed downwardly below the upper portion of the windows of said car whereby the light is distributed throughout a car without glare, and a reflector plate for directing a portion of the light from said source on the undersurface of the duct to illuminate the undersurface.

12. In combination with a railway car having a central aisle and a curved ceiling adapted to reflect and diffuse light, an elongated overhead lighting structure including a trough extending longitudinally of the car above said central aisle, a source of light in the trough, a reflecting surface associated with the trough for directing light from said source against the ceiling whereby the light is distributed throughout the car without glare, and a reflector plate for directing a portion of light from said source on the under surface of the structure to illuminate said undersurface and to reflect light into said aisle.

13. In combination with a railway car or similar vehicle, an overhead lighting structure extending longitudinally of the vehicle from one end portion to the other symmetrical with the car center line and having an undersurface to be illuminated, a source of light within the structure, means including elongated reflecting means extending longitudinally beneath the source of light directing light outwardly toward one side of the structure, curved ceiling sheets adapted to reflect the light emanating from the source and distribute it throughout the car without glare, said source of light being hidden by the structure from the direct view of the vehicle occupants, and reflector means adjacent to said under surface for illuminating said under surface of the structure from said source of light, said undersurface having a plurality of longitudinal corrugations upon which light from said source is directed.

14. In a lighting system for a railway car having a passenger compartment and a ceiling adapted to reflect and diffuse light, an elongated lighting structure opening laterally outwardly in both directions continuously throughout its length, said structure extending along the central portion of the car above said passenger compartment, sources of light within said structure, light reflecting means below said sources and intercepting the direct rays of light from said sources that otherwise could be seen by the passengers, and reflecting the same outwardly and upwardly onto said ceiling for distributing the same throughout the car without glare, and means for illuminating the undersurface of said structure.

15. In a railway car or similar elongated vehicle body having a side wall and a curved ceiling sheet extending from said wall toward the center of the body ceiling, an overhead lighting structure including a set of light sources mounted in the body ceiling adjacent the named ceiling sheet, all the light sources of said set being arranged in a single line, a light shield comprising plate means disposed lengthwise of the body below the level of the light sources of said set and forming with the adjacent portion of the named ceiling sheet a lighting chamber, said shield having a lateral edge forming with said ceiling sheet a side opening for the chamber through which opening light is directed on to the ceiling sheet and the side wall only above the eye level of a standing passenger, said ceiling sheet being surfaced to reflect its directly received light downwardly into the lower zones of the car, and said shield having an opening inwardly of said edge, in combination with an elongated plate substantially coextensive with the chamber and mounted below the level thereof for receiving light from said chamber through said opening and reflecting said light on to the under surface of said lighting structure adjacent the center line of the vehicle body.

16. In a railway car or similar elongated vehicle body having side walls and curved ceiling sheets connecting said walls with the central zone of the body ceiling, an overhead lighting structure extending along the central zone only of the body ceiling including an elongated lighting chamber having a side opening facing one of said ceiling sheets, illuminating means for the inside of said chamber comprising exclusively a set of light sources, all the sources comprising said set being arranged in a single line and mounted within the chamber so as to direct light through said opening on to said ceiling sheet while being shielded by the bottom wall of said chamber from directly shining on the named adjacent side wall of the car substantially below the eye level of a standing passenger, said ceiling sheet being surfaced to reflect its directly received light downwardly into the lower zones of the car, in combination with an elongated plate substantially coextensive with the chamber and mounted below the level thereof for receiving light from said chamber through an opening therein spaced inwardly of said first named opening and reflecting said light onto the under surface of said lighting structure adjacent the center line of the vehicle body.

17. In a railway car or similar elongated vehicle body having a side wall and a curved ceiling sheet extending from said wall toward the center of the body ceiling, an overhead lighting structure including a set of light sources mounted in the body ceiling adjacent the named ceiling sheet, all the light sources of said set being arranged in a single line, a light shield comprising plate means disposed lengthwise of the body below the level of the light sources of said set and forming with the adjacent portion of the named ceiling sheet a lighting chamber, said shield having a lateral edge portion terminating in a lip spaced below the horizontal median plane of the light sources and forming with said ceiling sheet a side opening for the chamber through which opening light is directed angularly upwardly and downwardly on to the ceiling sheet and the side wall only above the eye level of a standing passenger, said ceiling sheet being surfaced to reflect its directly received light downwardly into the lower zones of the car, and said shield having an opening inwardly of said edge portion, in combination with an elongated plate substantially coextensive with the chamber and mounted below the level thereof for receiving light from said chamber through said opening and reflecting said light on to the under surface of said lighting structure adjacent the center line of the vehicle body.

18. In a railway car or similar elongated vehicle body having side walls and curved ceiling sheets connecting said walls with the central zone of the body ceiling, an overhead lighting structure extending along the central zone only of the body ceiling including an elongated lighting chamber having a side opening facing one of said ceiling sheets, illuminating means for the inside of said chamber comprising exclusively a set of light sources, all the sources comprising said set being arranged in a single line and mounted within the chamber with at least a portion of each light source above the level of the bottom of said side opening so that light will be directed through said opening on to said ceiling sheet and angularly downwardly on to the adjacent wall while being shielded by the bottom wall of said chamber from falling directly on said side wall substantially below the eye level of a standing passenger, said ceiling sheet being surfaced to reflect its directly received light downwardly into the lower zones of the car, in combination with an elongated plate substantially coextensive with the chamber and mounted below the level thereof for receiving light from said chamber through an opening therein spaced inwardly of said first named opening and reflecting said light on to the under surface of said lighting structure adjacent the center line of the vehicle body.

19. In combination with an overhead duct in a railway car or similar vehicle through which air is adapted to be circulated, lighting troughs running longitudinally along opposite sides of the duct, lighting means within the troughs, curved interior finish sheets adapted to reflect the light emanating from the troughs and distribute it throughout the car without glare, said lighting means being hidden by said troughs from the direct view of the vehicle occupants, and said duct being provided with an opening positioned so that the air circulated through the duct serves to ventilate the lighting means.

20. In combination with an overhead duct in a railway car or similar vehicle through which air is adapted to be circulated, lighting means extending longitudinally of the car adjacent to the duct, laterally spaced reflecting surfaces running longitudinally of the car for reflecting light from said means upwardly and laterally, curved interior finish sheets to reflect the light emanating from the lighting means and said reflecting surfaces and to distribute it throughout the car without glare, the lighting means being hidden by said reflecting surfaces from the direct view of the vehicle occupants, and the duct being provided with an opening positioned so that the air circulated through the duct serves to ventilate the lighting means.

21. In combination with a railway car or similar vehicle, an overhead lighting structure extending longitudinally of the vehicle symmetrical with the car center line and having an undersurface to be illuminated, sources of light within the structure, elongated reflecting means extending longitudinally of the vehicle beneath said sources of light, curved ceiling sheets adapted to reflect the light emanating from the sources and distribute it throughout the car without glare, said sources of light being hidden by the structure from the direct view of the vehicle occupant, and means for illuminating said undersurface of the structure, said means including a reflecting surface at least a portion of which extends beneath said undersurface.

MARTIN P. BLOMBERG.
WILLIAM H. MUSSEY.